United States Patent
Brun et al.

(10) Patent No.: US 9,651,924 B2
(45) Date of Patent: May 16, 2017

(54) COMMON AUTOMATION SYSTEM CONTROLLER

(71) Applicants: Gerhard Brun, Luzern (CH); James Coogan, Des Plaines, IL (US); Heinrich Meier, Schindellegi (CH); Herbert Meier, Baar (CH); Franz Renggli, Buchrain (CH)

(72) Inventors: Gerhard Brun, Luzern (CH); James Coogan, Des Plaines, IL (US); Heinrich Meier, Schindellegi (CH); Herbert Meier, Baar (CH); Franz Renggli, Buchrain (CH)

(73) Assignee: SIEMENS SCHWEIZ AG, Zürich (CH)

( * ) Notice: Subject to any disclaimer, the term of this patent is extended or adjusted under 35 U.S.C. 154(b) by 1028 days.

(21) Appl. No.: 13/895,044

(22) Filed: May 15, 2013

(65) Prior Publication Data
US 2014/0343731 A1 Nov. 20, 2014

(51) Int. Cl.
*G05B 13/02* (2006.01)
*H04L 12/28* (2006.01)

(52) U.S. Cl.
CPC .......... *G05B 13/02* (2013.01); *H04L 12/2803* (2013.01)

(58) Field of Classification Search
None
See application file for complete search history.

(56) References Cited

U.S. PATENT DOCUMENTS

2008/0209342 A1* 8/2008 Taylor ............... G05B 15/02
715/747
2011/0184564 A1 7/2011 Amundson et al.

OTHER PUBLICATIONS

Markus Voelter et al: "Product Line Engineering Using Domain-Specific Languages", Software Product Line Conference (SPLC), 201115th International, IEEE, Aug. 22, 2011, pp. 70-79, XP031968894, DOI: 10.1109/SPLC.2011.25, ISBN: 978-1-4577-1029-2. (10 pages).
Rosenmüller Marko et al; "Tailoring dynamic software product lines"; Generative Programming and Component Engineering, ACM, 2 Penn Plaza, Suite 701, New York 10121-0701, USA; pp. 3-12; ISBN:978-1-4503-0689-8; DOI: 10.1145/2047862.2047866; XP058005370; (10 pages).
Voelter Markus et al; "Product Line Implementation using Aspect-Oriented and Model-Driven Software Development"; 11th Software Product Line Conference (SPLC), IEEE, Piscataway, NJ, USA; pp. 233-242; ISBN: 978-0-7695-2888-5; XP031139415. (10 pages).
Maier G. E. et al; "A Dynamically Configurable General Purpose Automation Controller"; Software for Computer Control. Selected Papers from Theifac/IFIP Symposium; pp. 47-52; XP001028643. (6 pages).
EP Search Report for EP Application No. 14166370.8-1862, dated Jul. 7, 2014. (11 pages).

* cited by examiner

*Primary Examiner* — Ryan Jarrett

(57) ABSTRACT

A common automation system controller configured using a hierarchical approach for use in a building automation system.

30 Claims, 17 Drawing Sheets

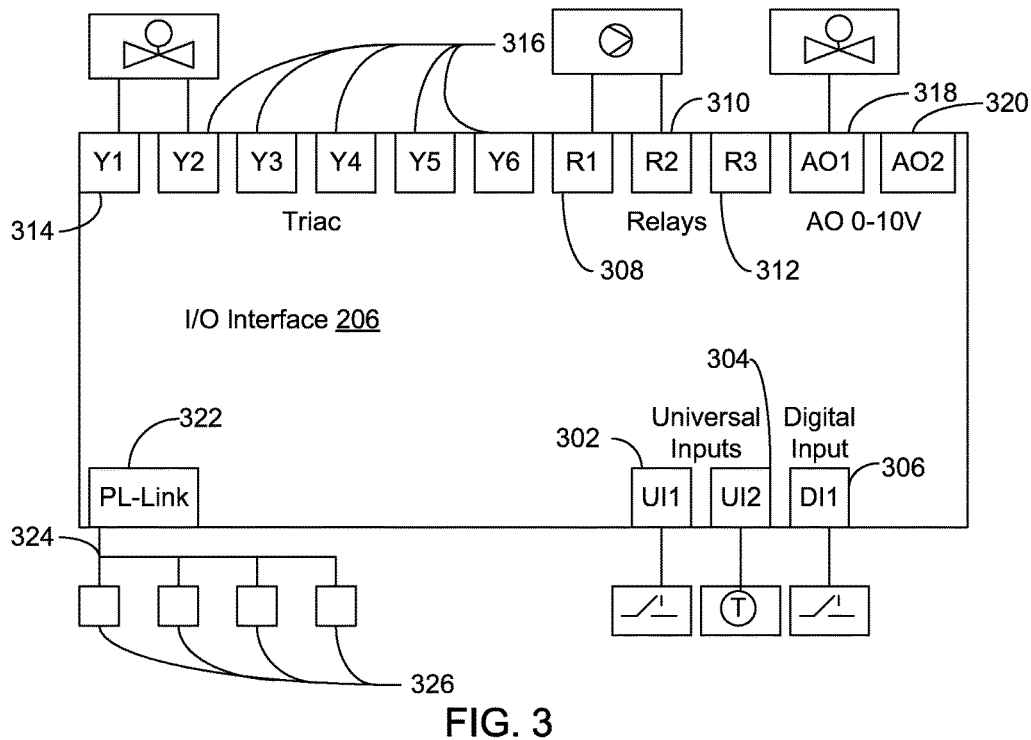

FIG. 3

| | | |
|---|---|---|
| 402 | Level 1 | Use preloaded application in the controller<br>- Select preloaded application<br>- High flexibility on I/O (e.g. 0..10V to 3P) w/o effecting application<br>- Configure |
| 404 | Level 2 | Download proven application from library<br>- Select proven application from library<br>- Configure and download |
| 406 | Level 3 | Adaptation of proven application from library<br>- Select proven application from library<br>- Add functionality or change application<br>- Test application<br>- Configure and download |
| 408 | Level 4 | Create own application<br>- Program own application<br>- Test application<br>-Configure and download |

FIG. 4

COMMON AUTOMATION SYSTEM CONTROLLER

FIELD OF THE INVENTION

This application relates to the field of building systems and, more particularly, to controllers used in a building automation system (BAS).

BACKGROUND

Building automation systems encompass a wide variety of systems that aid in the monitoring and control of various aspects of building operation. Building automation systems (which may also be referred to herein as "building control systems") include security systems, fire safety systems, lighting systems, shading systems, and heating, ventilation, and air conditioning (HVAC) systems. Lighting systems shading systems, and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

One example of a building automation system control station is the Apogee® Insight® Workstation, available from Siemens Industry, Inc., Building Technologies Division, of Buffalo Grove, Ill. ("Siemens"), which may be used with the Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points". Field devices are typically in communication with field panels of building automation systems and are operative to measure, monitor, and/or control various building automation system parameters. Example field devices include lights, blinds, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices.

Large commercial and industrial facilities have numerous field devices that are used for environmental control purposes. Many of these field devices are controllers that have been configured for a specific type of control and communication (such as BACnet). Many variants of a field device are manufactured to address the different types of environments and uses of the controllers. For example, variants of controllers are needed to address the different operating environments such as 12 volt system, 24 volt system, steam valves, fan control, dual duct, etc. . . . Thus, many variants of the hardware and software must be developed and maintained.

One approach that has been attempted to address the problem of multiple variants of hard and software was to allow custom configuration of a field device where environmental parameters would be defined and used in a customized field device for a specific location. This approach was soon identified as being labor intensive and prone to human configuration errors that resulted in additional testing and implementation time. With every BAS having numerous field devices, the cost and time for implementation made it undesirable.

What is needed in the art is an approach that will address these issues and problems identified above.

SUMMARY

In accordance with one embodiment of the disclosure, there is provided a field device and field device configuration approach that reduces the number of unique hardware variants and field configurations of field devices by using a common controller and limiting the number of interface variants and the number of housings used with field devices. The common controller may be configured in the field with a user interface. Different interface boards may be used with the controller to make a field device for different types of environments and applications, such as voltage, steam, forced air, controlling blinds, etc.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 3 illustrates an exemplary block diagram of the I/O interface 206 of FIG. 2;

FIG. 4 illustrates a chart of the levels of engineering flexibility achieved with the use of a common automation system controller, such as common automation system controller 128 of FIG. 1;

DESCRIPTION

Figure 1:
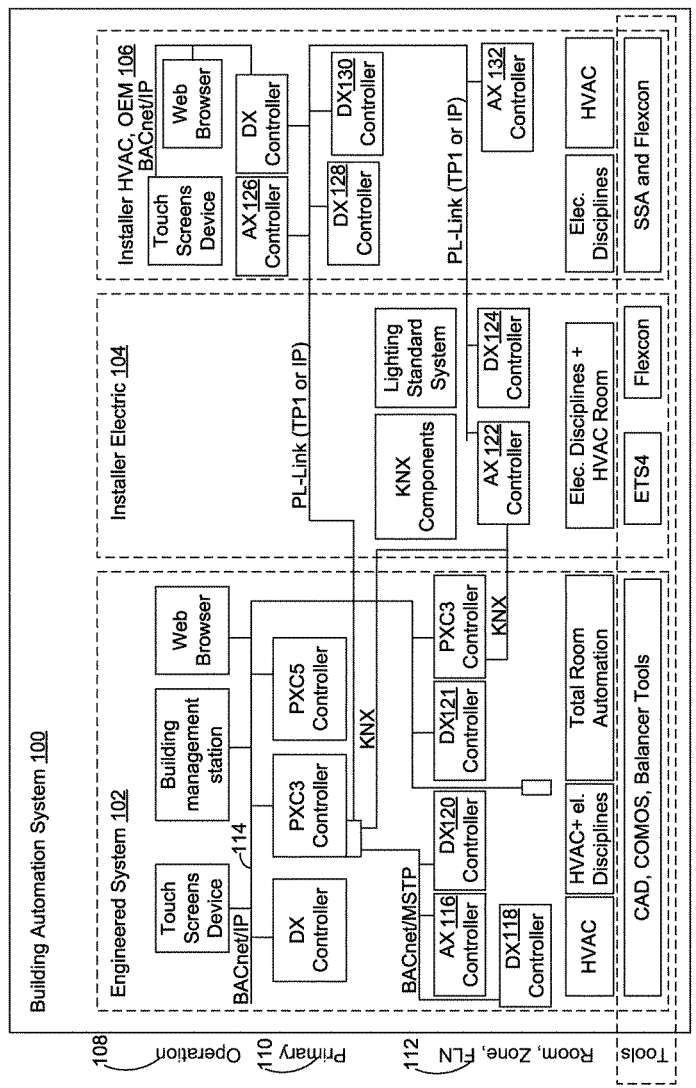
FIG. 1 illustrates an exemplary topology diagram for a building automation system (BAS) having field devices.

An example approach for configuration of field devices is described. With reference to FIG. 1, an exemplary topology diagram 100 for a building automation system ("BAS") having field devices is shown. The topology diagram 100 is divided into engineered system 102, installer electronic 104, and installer HVAC, OEM 106. The hierarchy of the topology diagram 100 may be divided into operations 108, primary 110, and Room/Zone/FLN 112. A network 114, such as a BACnet/IP network, may connect the different control systems and field devices in BAS 100. Field devices may include common automation system controllers, such as 116-132. Some of the common automation system controllers may operate building systems such as opening and closing blinds, electrical systems, and HVAC systems.

Figure 2:
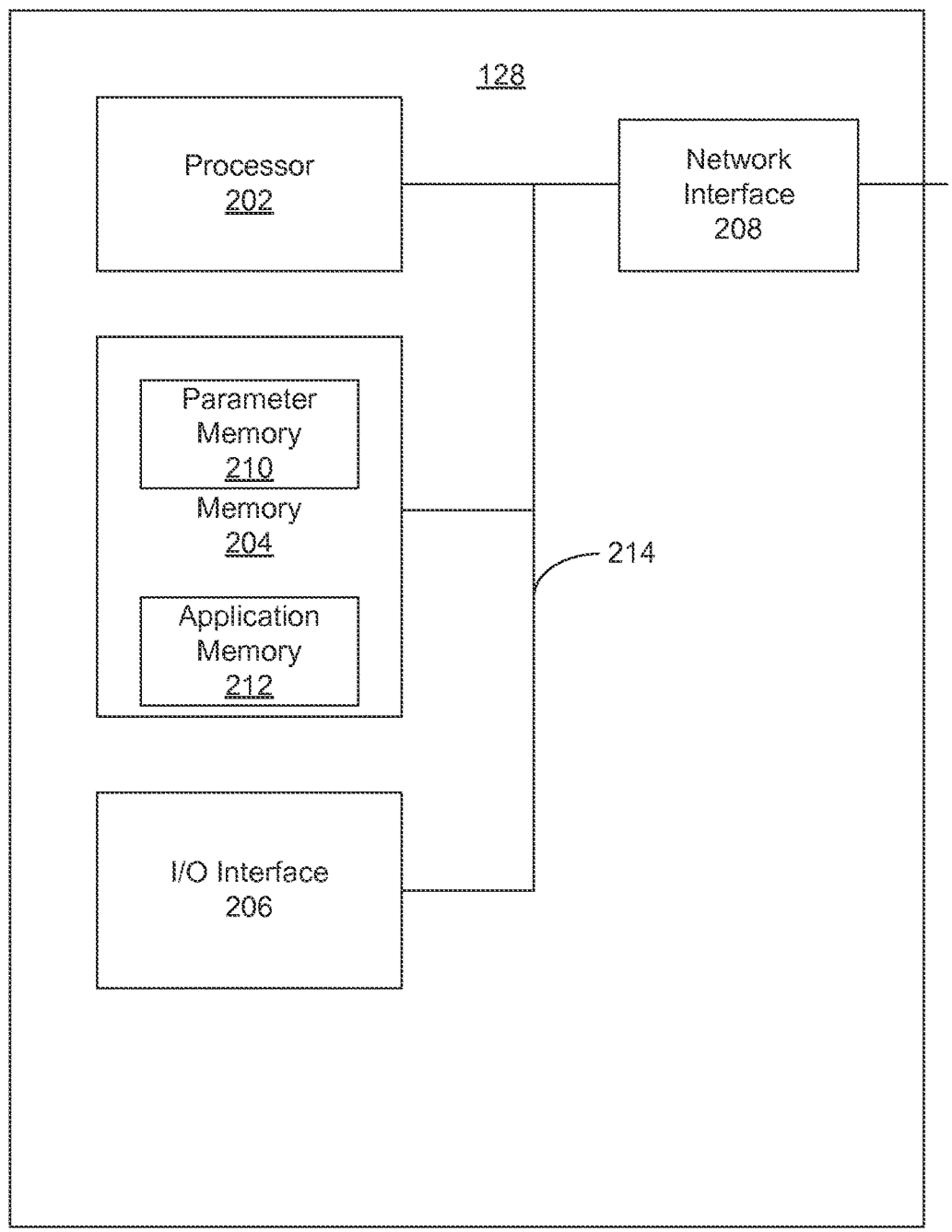
FIG. 2 illustrates an exemplary block diagram of a common automation system controller 128 of FIG. 1 in accordance with an example implementation.

Turning to FIG. 2, an exemplary block diagram of a common automation system controller 128 of FIG. 1 in accordance with an example implementation is depicted. The common automation system controller 128 may have a processor 202, memory 204, I/O interface 206, and network interface 208 connected by one or more buses 214. The processor 202 may be a general purpose microprocessor, microcontroller, application specific processor, reduced instruction set processor, digital logic configured to operate as a state machine, analog circuits configured to operate as a state machine, or a combination of analog and digital circuits operating as a state machine.

The memory 204 may be static, dynamic or a combination of memory types. The memory 204 may be further subdivided into parameter memory 210 and application memory 212. The parameter memory 210 may store transient programs and parameters. The application memory 212 may store an operating system and other applications that may be permanently resident on the common automation system controller 128.

The network interface 208 may couple the common automation system controller 128 to a network, such as a BACnet/IP network. Data and control data may be exchanged with other devices in the BAS via the network interface 208. The I/O Interface 206 enables control and communication with actuators and sensors. The I/O Interface 206 may be implemented as a separate assembly that is coupled to the network interface 208. The I/O Interface 206 may also, in some implementations, provide a serial interface for configuring or communication with the common automation system controller 128. In other implementations, the network interface 208 may be used for configuring the common automation system controller 128. In yet other implementations, both a serial (not illustrated) interface and network interface 208 may be used to communicate with the common automation system controller 128.

In FIG. 3, an exemplary block diagram of the I/O interface 206 of FIG. 2 is depicted. The I/O interface 206 may include universal or analog inputs 302 and 304, digital input 306, and relay connections R1 308, R2 310, and R3 312. Alternating current (AC) outputs Y1-Y6 314-316 may be directly connected to small fans and other AC devices. Analog outputs A01 318 and A02 320 may be used for variable control of devices, such as the speed of a fan or opening of a valve. In the current example, a PL-Link 322 is provided for integration with other field-deployed buses 324 that may enable additional communication with sensors, actuators, and other devices 326. In other implementations, different numbers and types of interface connections may be provided for inputting and outputting of data and control signals from the common automation system controller 128 via I/O interface 206.

Turning to FIG. 4, a chart 400 of the levels of engineering flexibility achieved with the use of a common automation system controller, such as common automation system controller 128 of FIG. 1, is shown. Level 1 402 of engineering flexibility is achieved with the use of preloaded applications in the common automation system controller 128. By having preloaded applications on the controller, flexibility of I/O may be maintained for configuring different parameters, such as voltage, without affecting the actual performance of the application. Since the applications are not modified, time and resources are saved by not having to test changes prior to implementation of the common automation system controller 128.

Level 2 404 of engineering flexibility may be achieved by having a library of proven applications where the applications are configurable prior to placement in the common automation system controller 128. Changes to the configured software may require testing, but the starting portion for the configuration is a known working application.

Level 3 406 of engineering flexibility starts with a proven application from a library, but the functionality of that application is changed or added to. These changes or additions typically require more extensive testing than Level 1 204 or Level 2 404. Level 3 406 engineering flexibility also requires more development time as new or additional functionality is being developed.

Level 4 408 of engineering flexibility has custom or unique applications being employed on the common automation system controller 128. Such custom or unique applications are the most labor intensive level of engineering and often have maintainability issues. Further, such approaches require the most intensive system testing to verify that they will fully function in a BAS. But, there are times where unique customer systems require Level 4 engineering flexibility. Examples of such unique customer systems may include retrofitted BAS to antiquated HVAC systems.

As described, all the different levels of engineering flexibility may be used with the common automation system controller 128. This four level approach is opposed to the common practice in the BAS and HVAC industry to deploy controllers that have dedicated applications (Level 1 402 of engineering flexibility). The four level approach results in a symmetry and consistency of applications executed by the common automation system controller 128 with regards to structures, functions, behavior, parameterization, operation & monitoring, and documentation. The symmetry and consistency indirectly results in a reduction of cost and time associated with preparing and deploying the common automation system controller 128.

Figure 5:
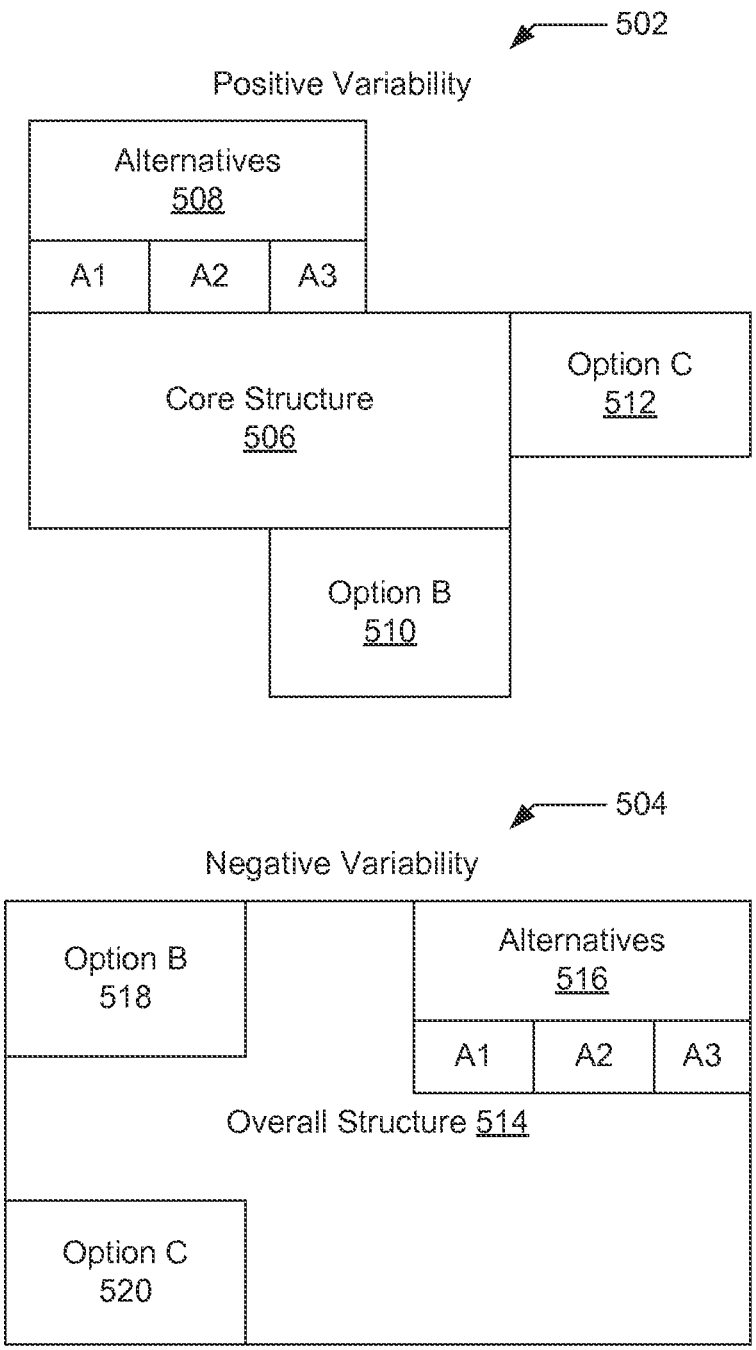
FIG. 5 illustrates a depiction of two diagrams of structural variability that are supported by the common automation system controller 128 of FIG. 1.

In FIG. 5, two diagrams 502 and 504 of structural variability that may be supported by the common automation system controller 128 of FIG. 1 are depicted. Diagram 502 depicts positive variability, where additional parts are added to a core structure or application. The core structure 506 has alternatives A1, A2, and A3 508. Additionally, options B 510 and C 512 may be added to the core structure. Diagram 504 depicts Negative Variability, where the overall structure has parts or modules removed. The overall structure 514 may have alternatives A1, A2 A3 516, option B 518 and Option C 520 removed. Both of the variability approaches may be used with the common automation system controller 128.

Figure 6:
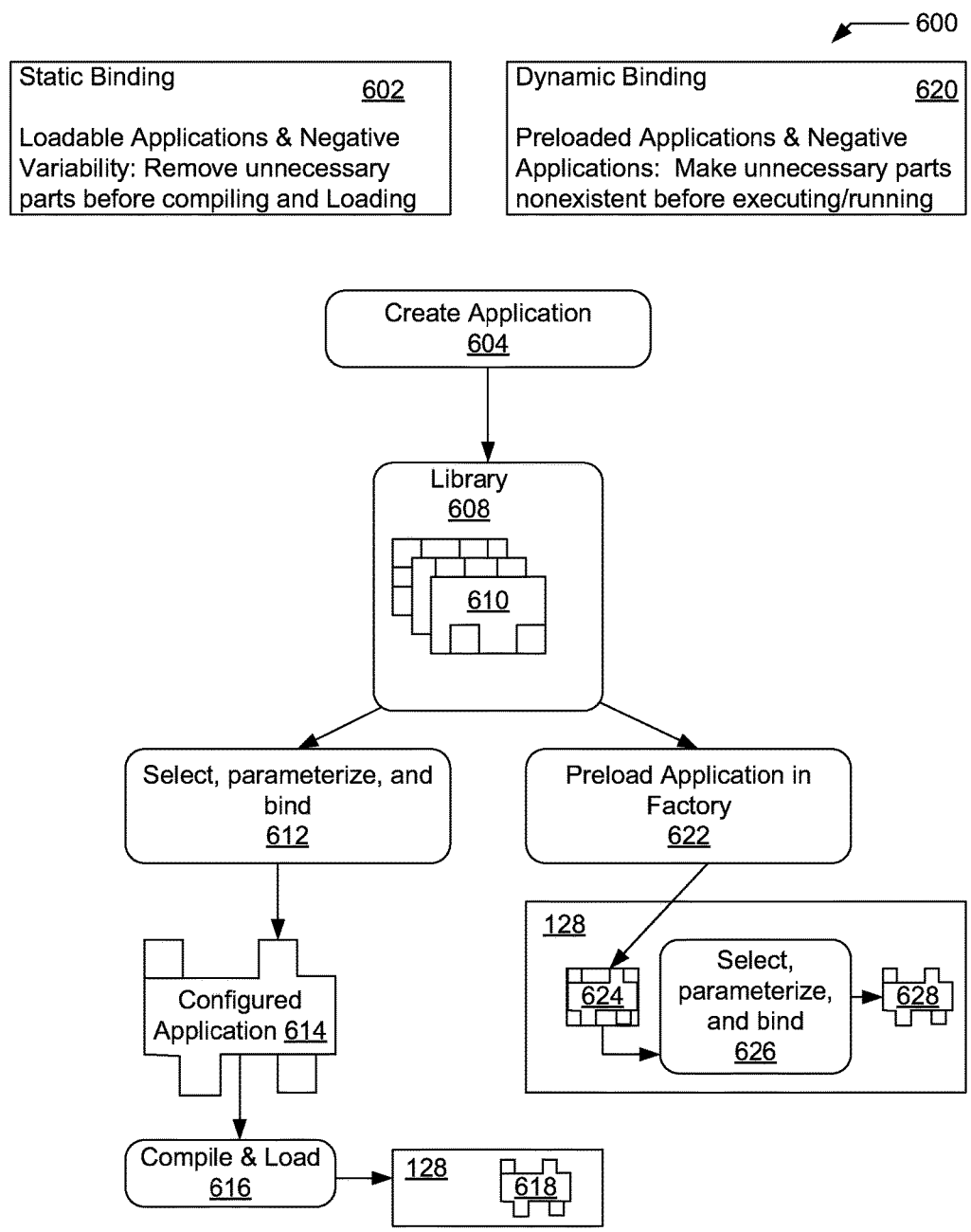
FIG. 6 illustrates a depiction of an approach for implementing structural variability in the configuration of the common automation system controller 128 of FIG. 1.

Turning to FIG. 6, a depiction 600 of an approach for implementing structural variability in the configuration of the common automation system controller 128 of FIG. 1 is depicted. Static binding 602 of functions at compile time is typically used for applications with negative variability. The unnecessary features or optional features are removed prior to or during compiling and loading of the application. An application 604 may be created or formed by accessing a library 608 of application types 610. The application type 610 is selected and parameterized 612. The resulting application 614 may then be compiled and loaded 616. The compiling may occur with a graphical object-oriented language in the current example, or in other implementations, programming languages such as C, C++, Java, Visual Basic, Python, or other high level language may be employed. In the current example, the binding may occur during parameterization 612. The resulting compiled application 618 may then be loaded onto the common automation system controller, such as common automation system controller 128.

Dynamic binding 620 may be used to create an application by selecting an application type 604 from a library 608 of application types 610. The application type with dynamic binding will typically be pre-loaded 622 in the application memory of a common automation system controller, such as application memory 212 of the common automation system controller 128. When the common automation system controller 128 is initialized or booted, the preloaded applications 624 are selected and parameterized with binding of the functions also occurring 626. The resulting parameterized or configured application 628 is then executed by the common automation system controller 128. As described, the same common automation system controller may be used with negative variability or positive variability.

Figure 7:
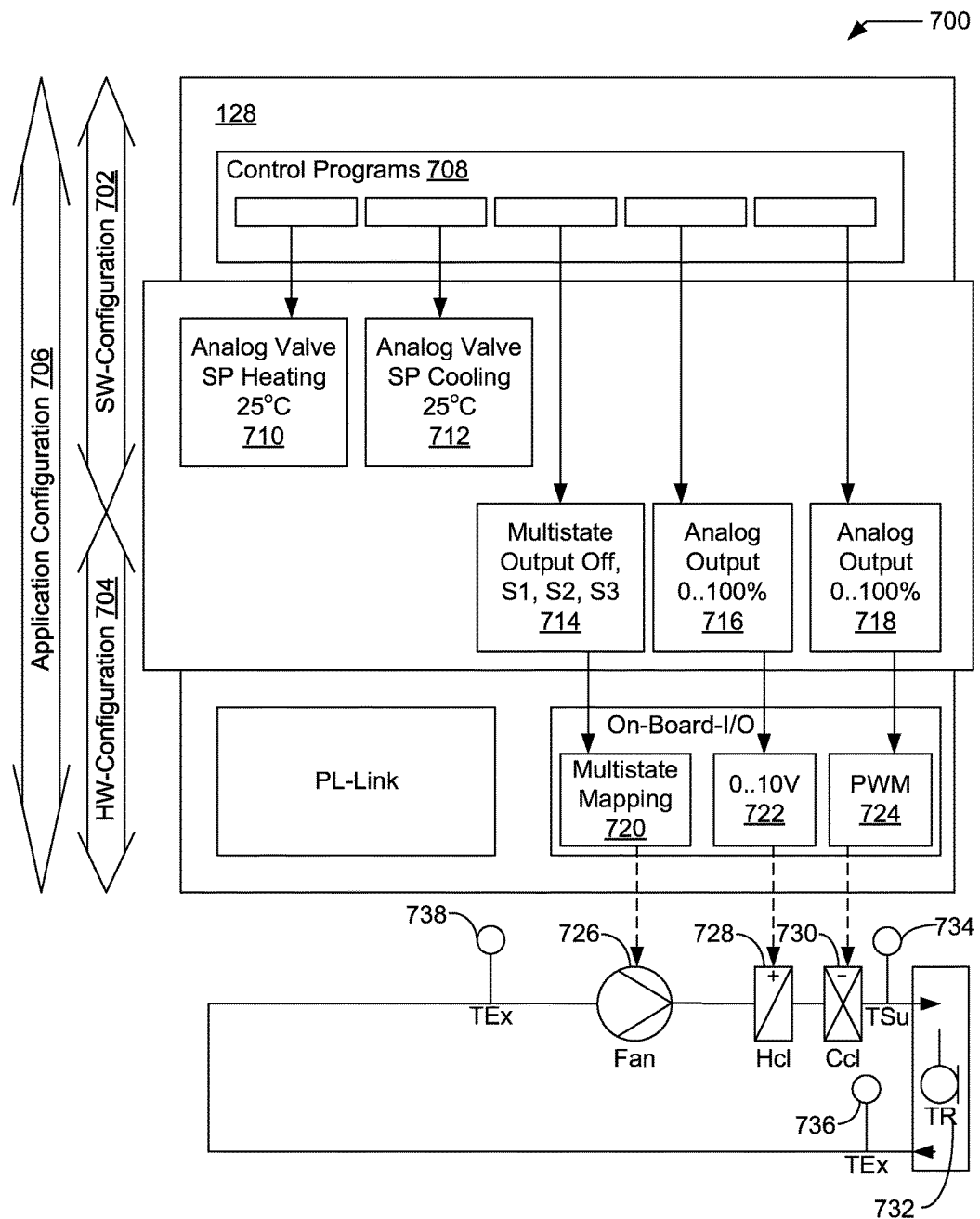
FIG. 7 illustrates an exemplary diagram of the software and hardware configuration of an application for a common automation system controller 128 of FIG. 1.

In FIG. 7, an exemplary diagram 700 of the software 702 and hardware 704 configuration of an application configuration 706 for a common automation system controller 128 of FIG. 1 is depicted. The software configuration includes 702 configuring data for control programs, operation & monitoring, and engineering & commissioning functions. The software configuration 702 further includes configuring data for the common automation system controller's role (i.e., control blinds, fans, valves, lights) in the BAS 100 and configuring virtual and real interface values for control applications. The software configuration 702 may include control programs 708 that originated as an application type in the library 608. Examples of control programs include heating applications, cooling applications, and blind controls to give a few examples. The control programs 708 may have parameters that are initially set (i.e., predefined set points), such as analog value set point for heating at 26 degrees Celsius 710 and analog value set point for cooling set to 22 degrees Celsius 712.

The hardware configuration 704 includes configuring data for peripheral devices, field buses, and data acquisition (such as sensors). The hardware configuration data 704 may also include configuring data for supporting sensors, actuators, and networked peripheral devices. The hardware configuration 704 may include configuration of outputs and inputs. In the current example, multistate outputs are configured for "Off", "S1", "S2", and "S3" 714 and two sets of analog outputs are configured to have a range of 0 to 100 percent 716 and 718. The outputs 714-718 are associated with input and output connections 720-724 on the I/O board that may be connected or coupled to the common automation system controller 128. The input and output connections 720-724 may be connected to devices, such as fan 726, heating unit 728, and cooling unit 730. The PL-Link network may also be configured to communicate with sensors, such as thermostat 732, supply temperature sensor 734 and exhaust temperature sensors 736 and 738.

Figure 8:
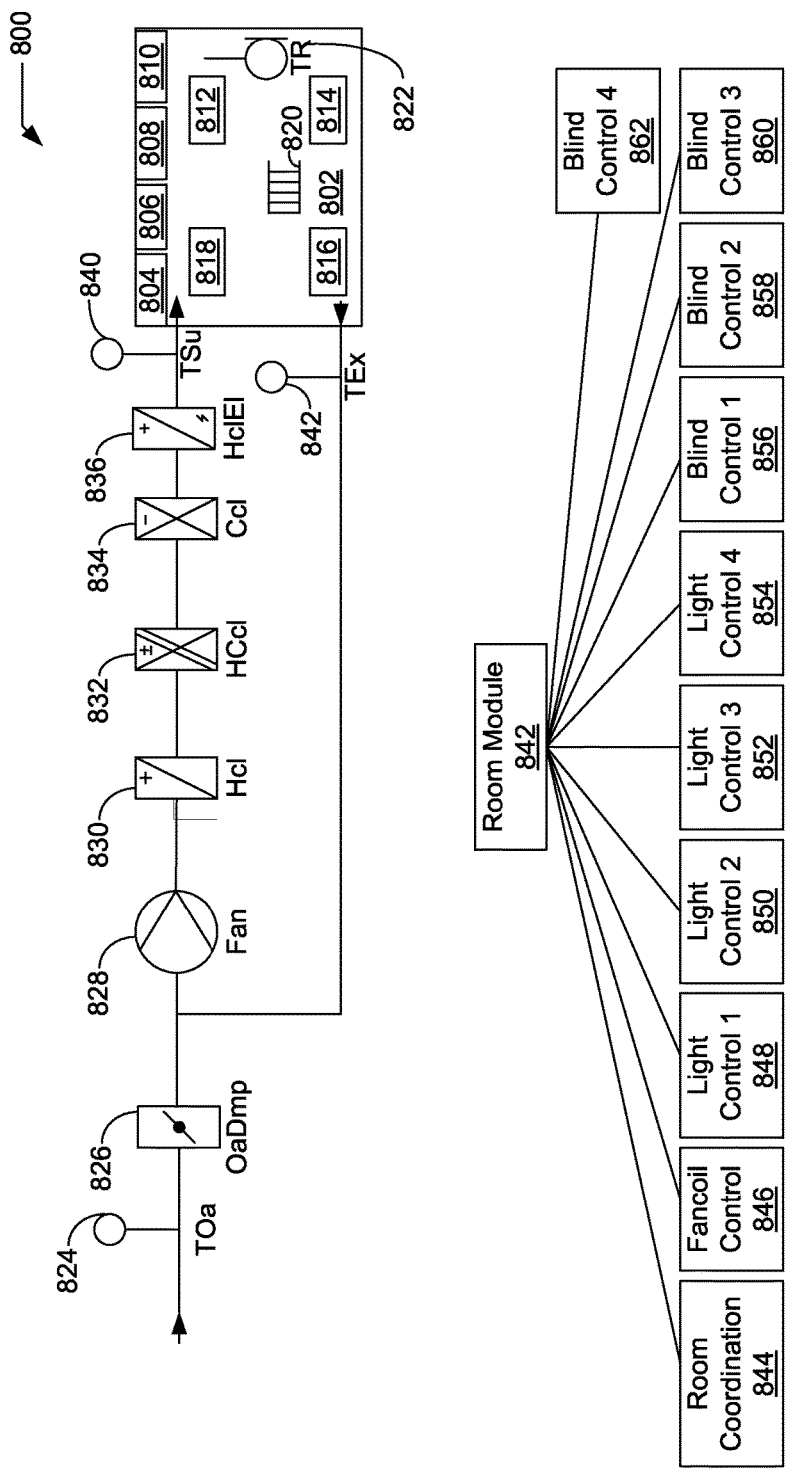
FIG. 8 illustrates an exemplary diagram of software programs, modules, or objects for the mechanical equipment for a room 802 that are loaded on a common automation system controller 128 of FIG. 1 to control the automated systems of a building.

Turning to FIG. 8 an exemplary diagram 800 of software programs, modules, or objects for the mechanical equipment of room 802 to be loaded on a common automation system controller 128 of FIG. 1 is depicted. The room 802 is shown with four automated blinds 804-810, four lights 812-818, radiator 820, and thermostat 822. The room 802 is also supported by HVAC equipment and sensors, such as temperature of outside air sensor 824, outside air damper 826, fan 828, heating coil 830, heating cooling coil 832 (sometimes referred to as a heat transfer coil), cooling coil 834, electric heater 836, supply temperature sensor 840, and return temperature sensor 842. The room 802 may be modeled as objects, modules or application types contained in a library.

The room module 842 that represents the room 802 may have a plurality of sub-modules to support the building automation control of the room 802. A room coordination module 844 may have parameters associated with settings for the different devices and sensors in the room 802. The fan 828 has an associated fan coil control sub-module 846 that may be configurable for the different types and voltages of fans that may be deployed in a BAS 100. Multiple light control sub-modules (light control 848-854) associated with the lights 812-818 are also supported. The four automated blinds 804-810 may be associated with blind control sub-modules 856-862. These sub-modules are associated with defining and supporting the configurations of the settings used in the room, such as temperature, light, and energy efficiency of the room 802.

Figure 9:
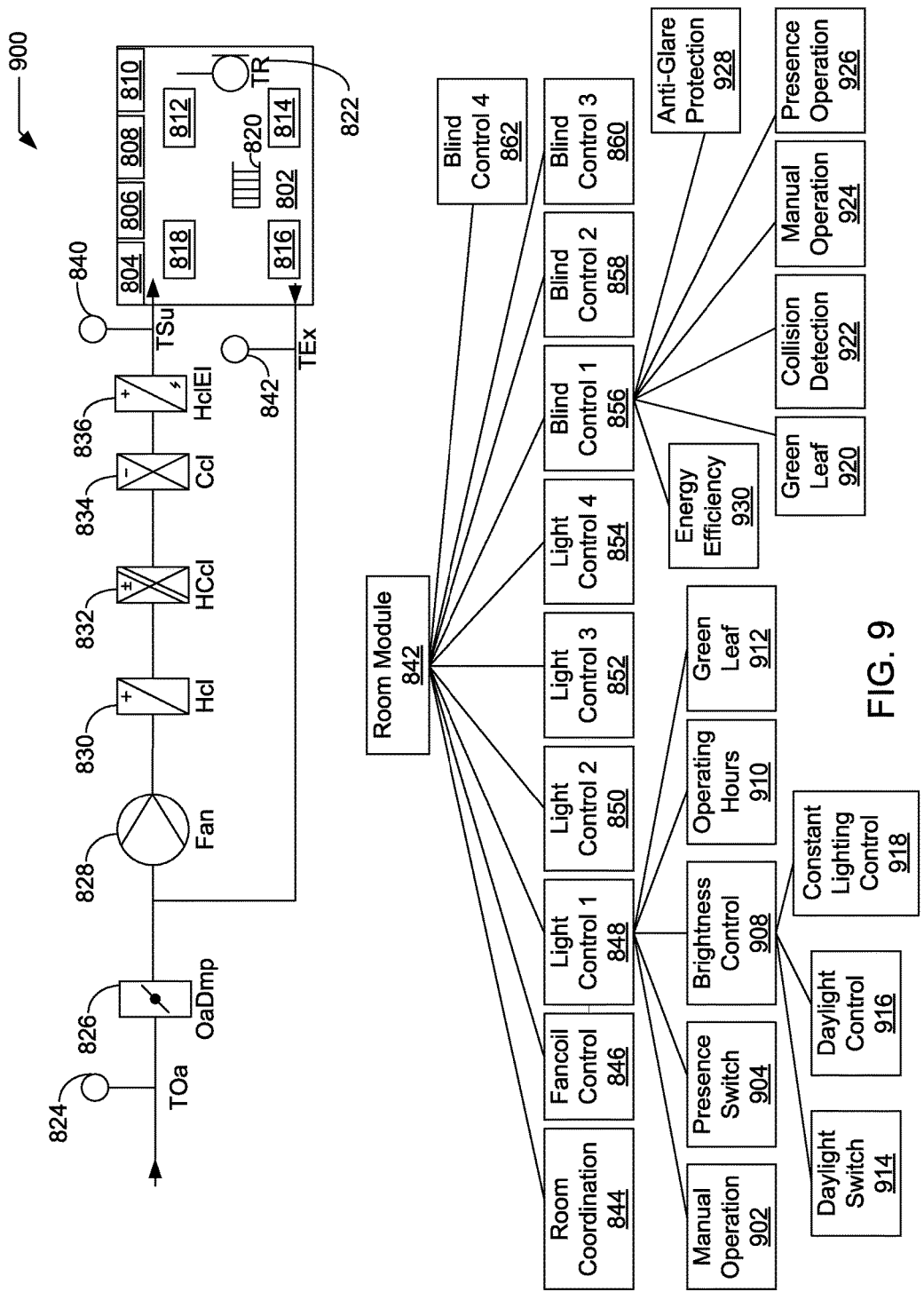
FIG. 9 illustrates is an exemplary diagram of software programs, modules, or objects for lighting and blind controls that are further defined for room 802 of FIG. 8.

In FIG. 9, an exemplary diagram 900 of software programs, modules, or objects for lighting and blind controls that are further defined for room 802 of FIG. 8 is depicted. The light control sub-module 848 associated with lights 812 may have further sub-modules that enable manual operation 902, presence switches (i.e., motion sensor switches) 904, brightness control 908, operating hours 910, Green Leaf operation 912 (energy saving operation parameters) and is associated with brightness control 908. The brightness control sub-module 908 may have further configurations or definitions for daylight switch 914, daylight control 916, and constant lighting control 918.

The blind control sub-module 856 may have further sub-modules that further define the operation of the blinds 804. These blind sub-modules may include Green Leaf operation 920, collision detection 922, manual operation 924, presence operation 926 (i.e., motion sensors), anti-glare protection 928, and energy efficiency 930. Thus, a hierarchical approach for defining library application types is demonstrated.

Figure 10:
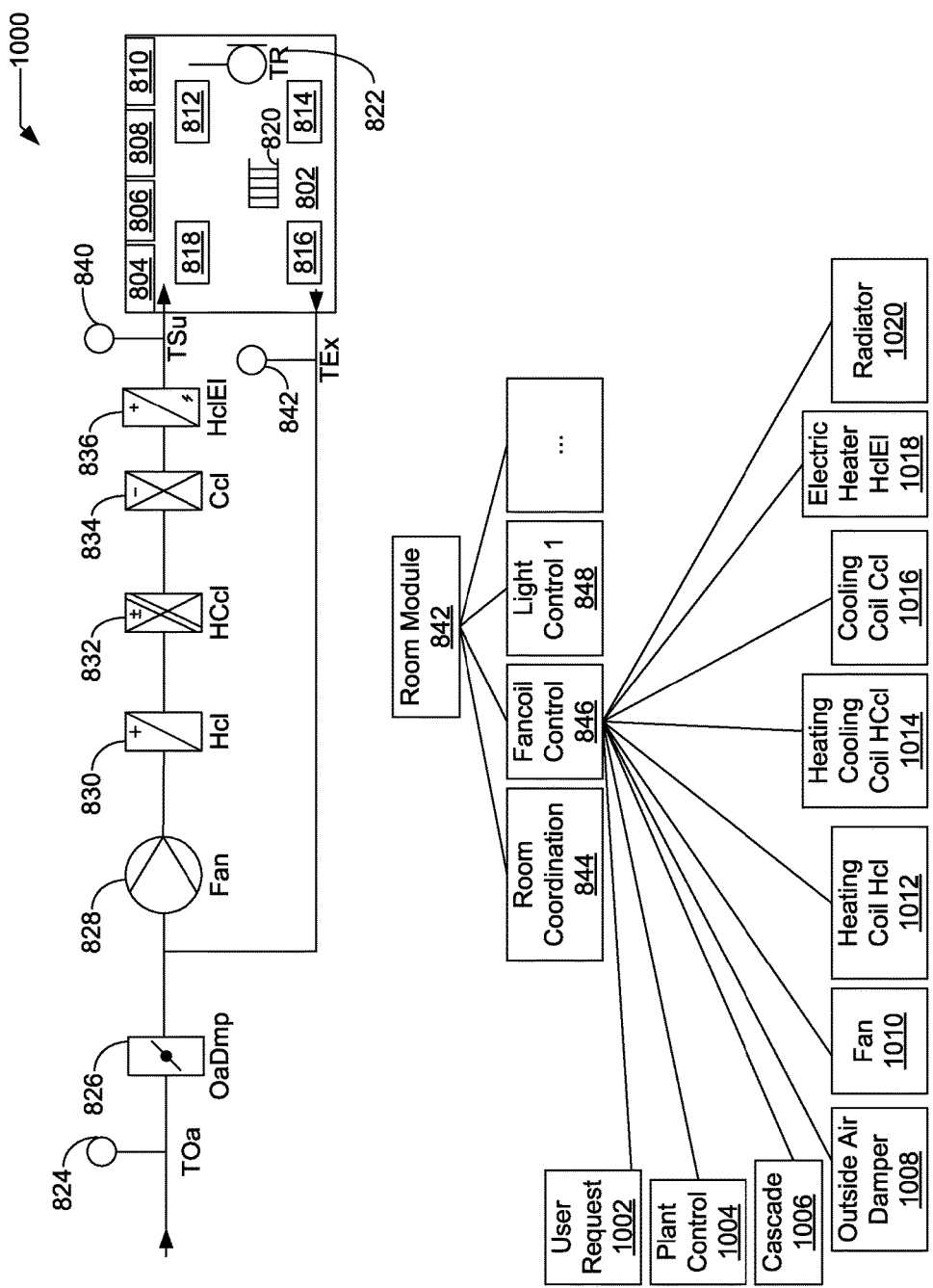
FIG. 10 illustrates an exemplary diagram of software programs, modules, or objects for fan coil control 846 that is further defined for room 802.

Turning to FIG. 10, an exemplary diagram 1000 of software programs, modules, or objects for fan coil control 846 that is further defined for room 802 is depicted. Fan coil control 846 has sub-modules for user request 1002, plant control 1004 (a supervisory function that coordinates parts of the BAS 100), and cascade 1006 (function to adjust the temperature at the coils to maintain room temperature). Additionally, the fan coil control 846 also has sub-modules for the outside air damper "OaDmp" 1008, fan 1010, heating coil "Hcl" 1012, heating and cooling coil "HCcl" 1014, Cooling Coil "Ccl" 1016, electric heater "HclEl" 1018, and radiator "Rad" 1020. Thus, sub-modules for sensors and mechanical equipment have been demonstrated.

Figure 11:
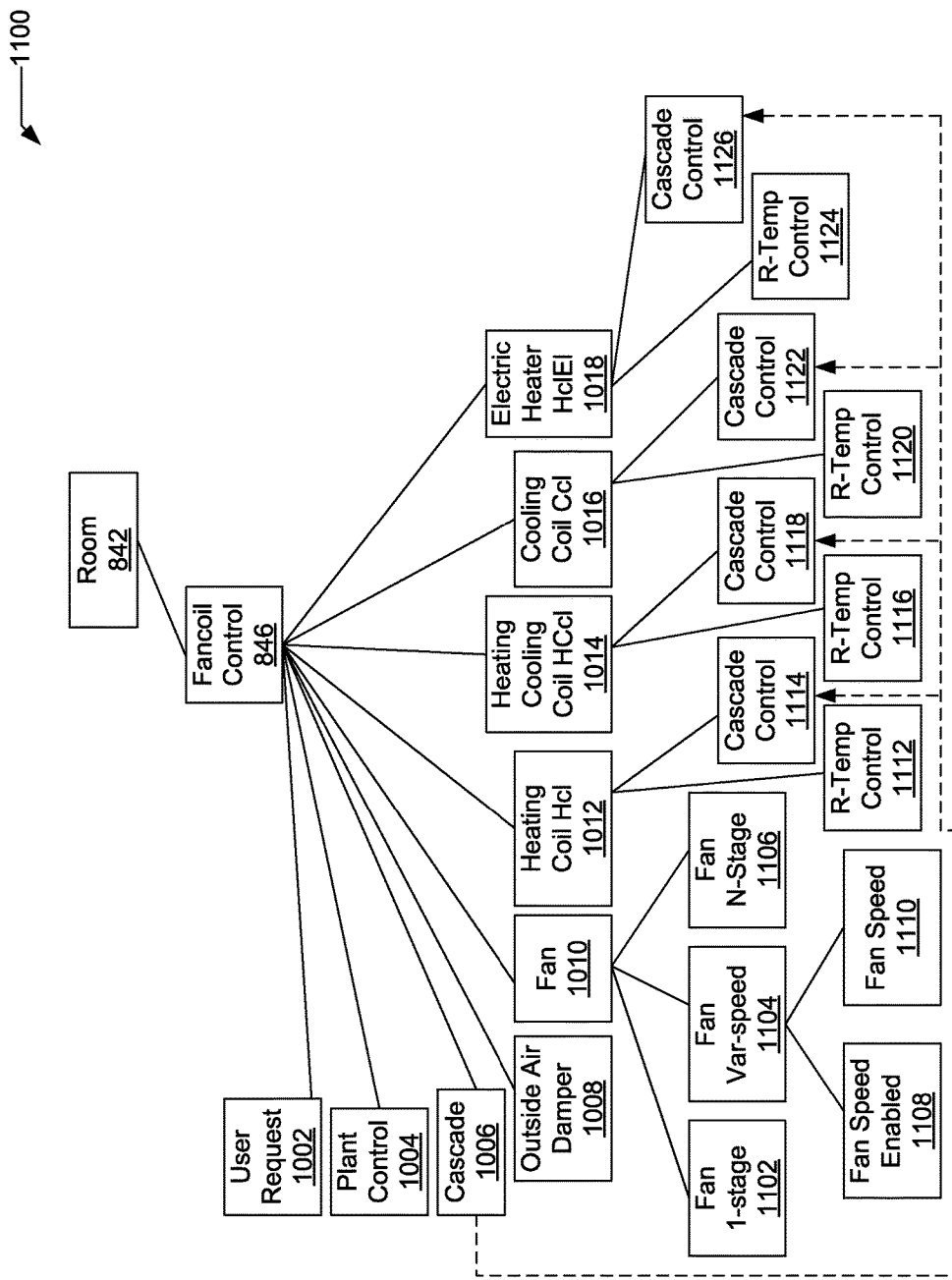
FIG. 11 illustrates an exemplary diagram of software programs, modules, or objects that further define the hardware and sensors associated with fan coil control 846.

In FIG. 11, an exemplary diagram 1100 of software programs, modules, or objects that further define the hardware and sensors associated with fan coil control 846 is depicted. Fan 1010 is further defined for a 1-stage fan 1102, variable speed fan 1104, and n-stage fan 1106. The variable speed fan 1104 may be further defined to have fan speed enabled 1108 and reporting for fan speed 1110. The heating/cooling coils 1012-1016 and electric heater 1018 may each have temperature controls 1112, 1116, 1120, and 1124, and cascade controls 1114, 1118, 1122, and 1126 that are associated with the cascade sub-module 1006.

Figure 12:
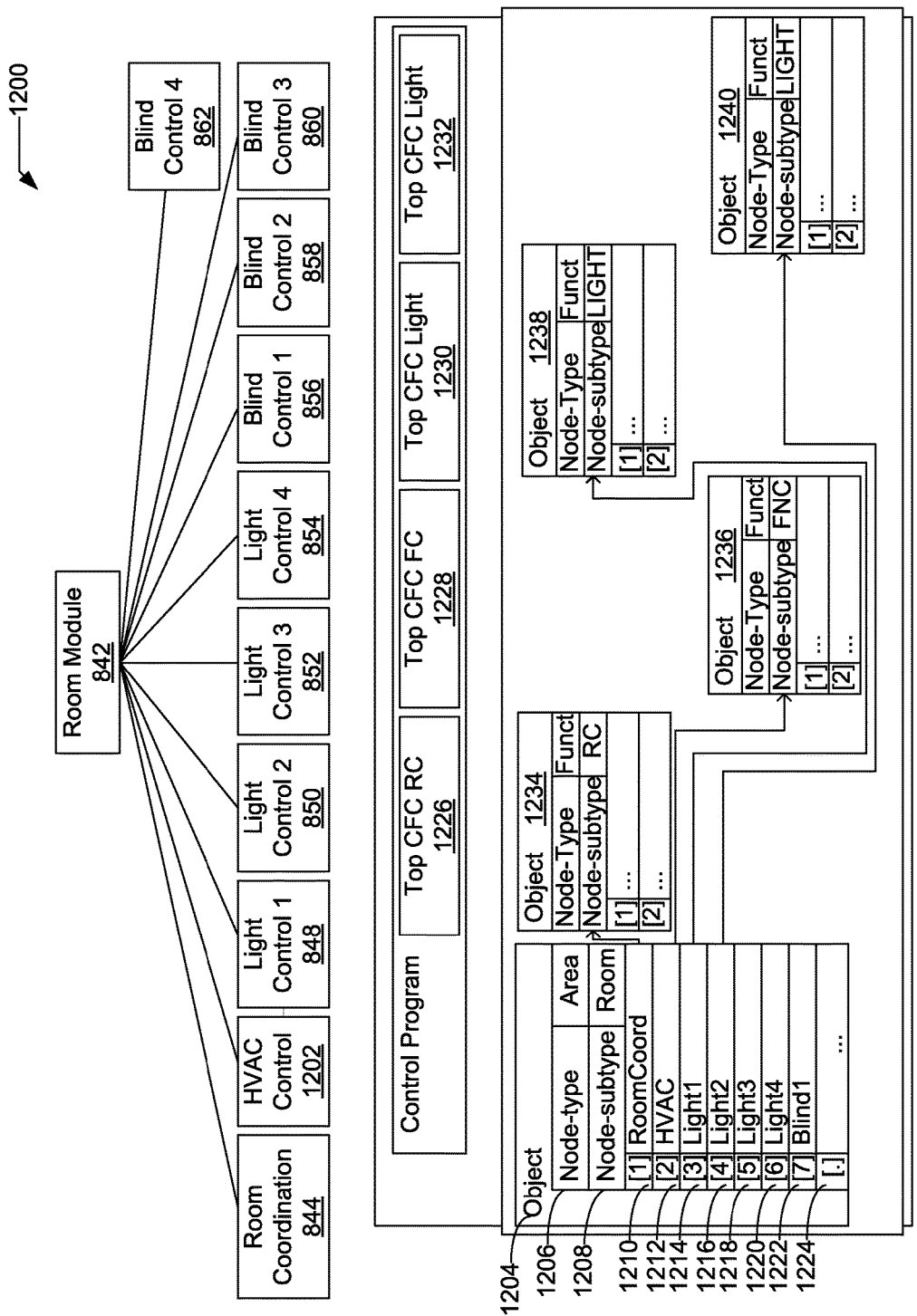
FIG. 12 illustrates an exemplary diagram of a software configuration structure for configuring modules and submodules associated with room 842 of FIG. 8 presented in a graphical interface.

Turning to FIG. 12, an exemplary diagram 1200 of a software configuration structure for configuring modules and sub-modules associated with room module representing room 842 of FIG. 8 presented in a graphical user interface is depicted. An object 1204 that defines the data and functions for the room is selected and defined to have multiple nodes. The object may be a node type 1206 "area" with a node subtype 1208 called "room." Nodes may be defined within the object 1204, such as nodes 1210-1224, which correspond to modules 844-862 and 1202. Each of the nodes may have an associated control program, such as 1226-1232 that may be executed within the common automation system controller 128 when it is initialized or otherwise started. Each of the nodes may also have additional parameters or data configured, such as 1234-1240.930. Thus, a hierarchical approach for defining library application types is demonstrated.

Figure 13:
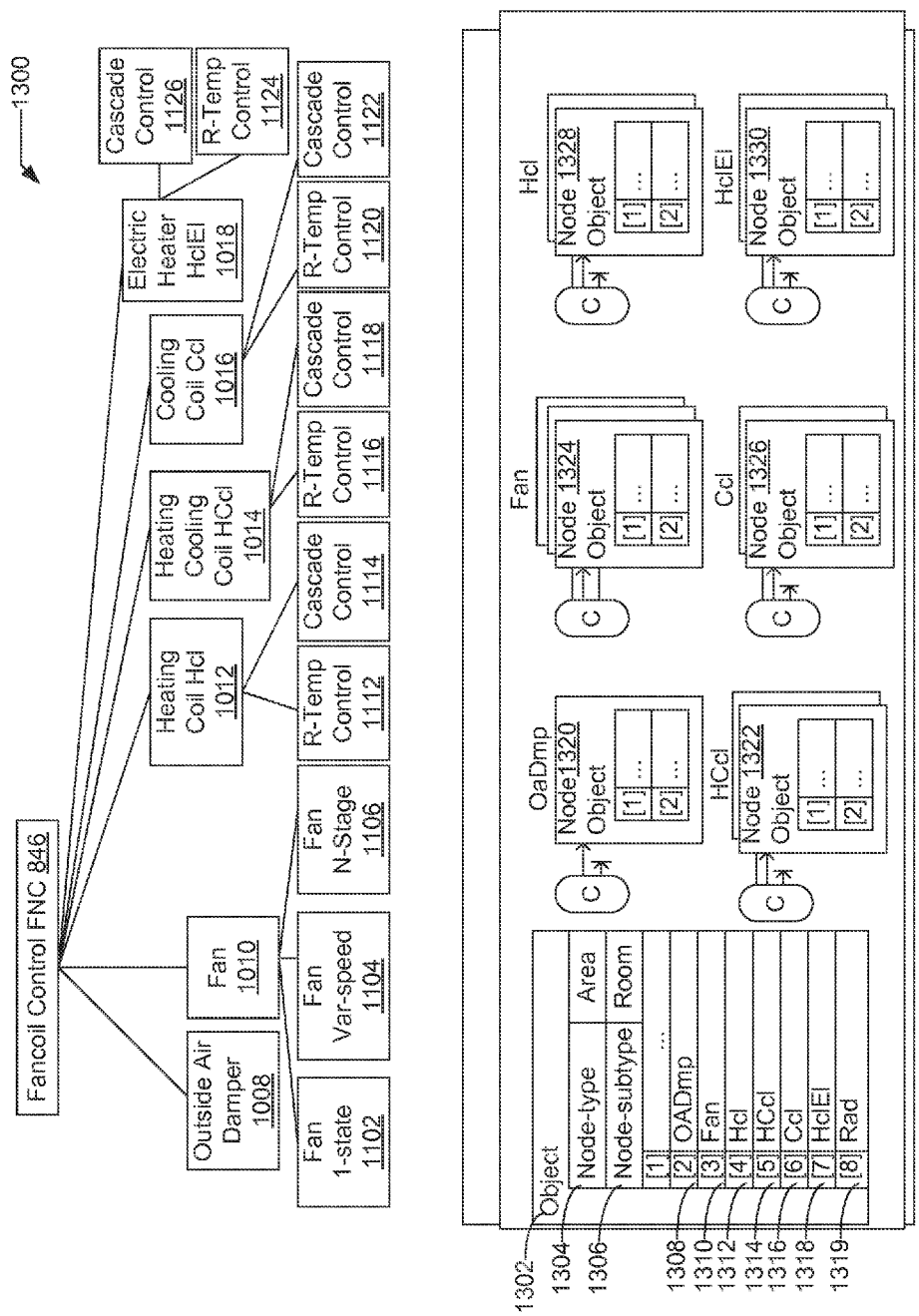
FIG. 13 illustrates an exemplary diagram of a software configuration structure for configuring the fan coil 846 of FIG. 8 presented in a graphical interface.

In FIG. 13, an exemplary diagram 1300 of a software configuration structure for configuring the fan coil 846 of FIG. 8 presented in a graphical interface is depicted. An object 1302 of type "functional" 1304 is selected with a node subtype of fan control ("FNC") 1306. The object 1302 may have nodes 1308-1319 where each node may also have additional parameters or data configured, such as 1320-1330. In the current example, the outside damper 1308 is an optional element whereas the fan comprises three alternative devices 1102-1106. Either during engineering (i.e., static binding) or at run time (i.e., dynamic binding) respective choices of options and alternatives may be selected. The selected functional units will then be auto-connected to the overall fan coil functional unit.

Figure 14:
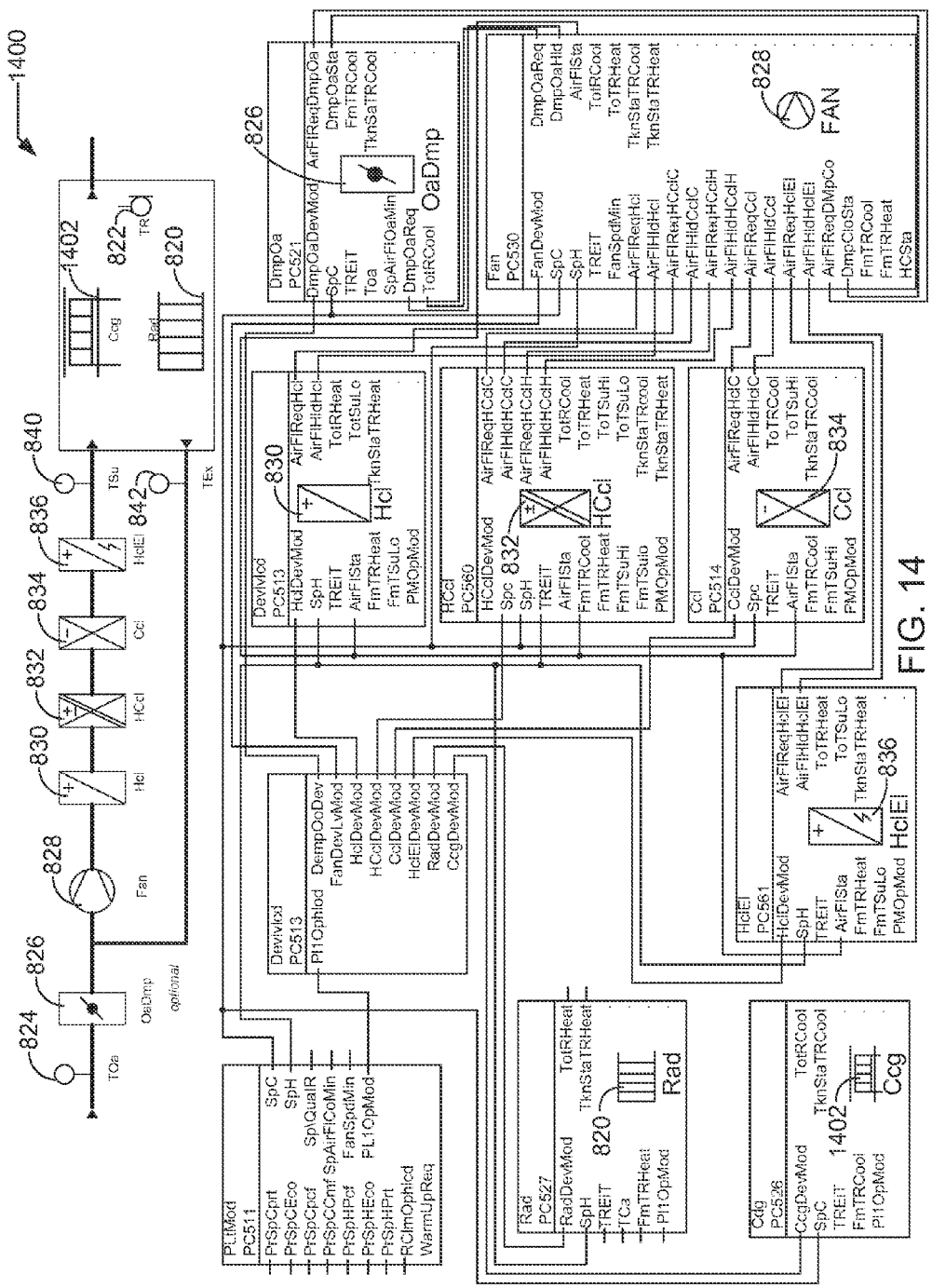
FIG. 14 illustrates an interface chart of the mechanical equipment for a room 802 of FIG. 8 in accordance with and example implementation.

Turning to FIG. 14, an interface chart 1400 of the mechanical equipment for a room 802 of FIG. 8 in accordance with an example implementation is shown. The mechanical equipment 820-840 and 1402 is shown with its associated data and control lines. Nodes in the object may represent the mechanical equipment and the nodes associated data flows.

Figure 15:
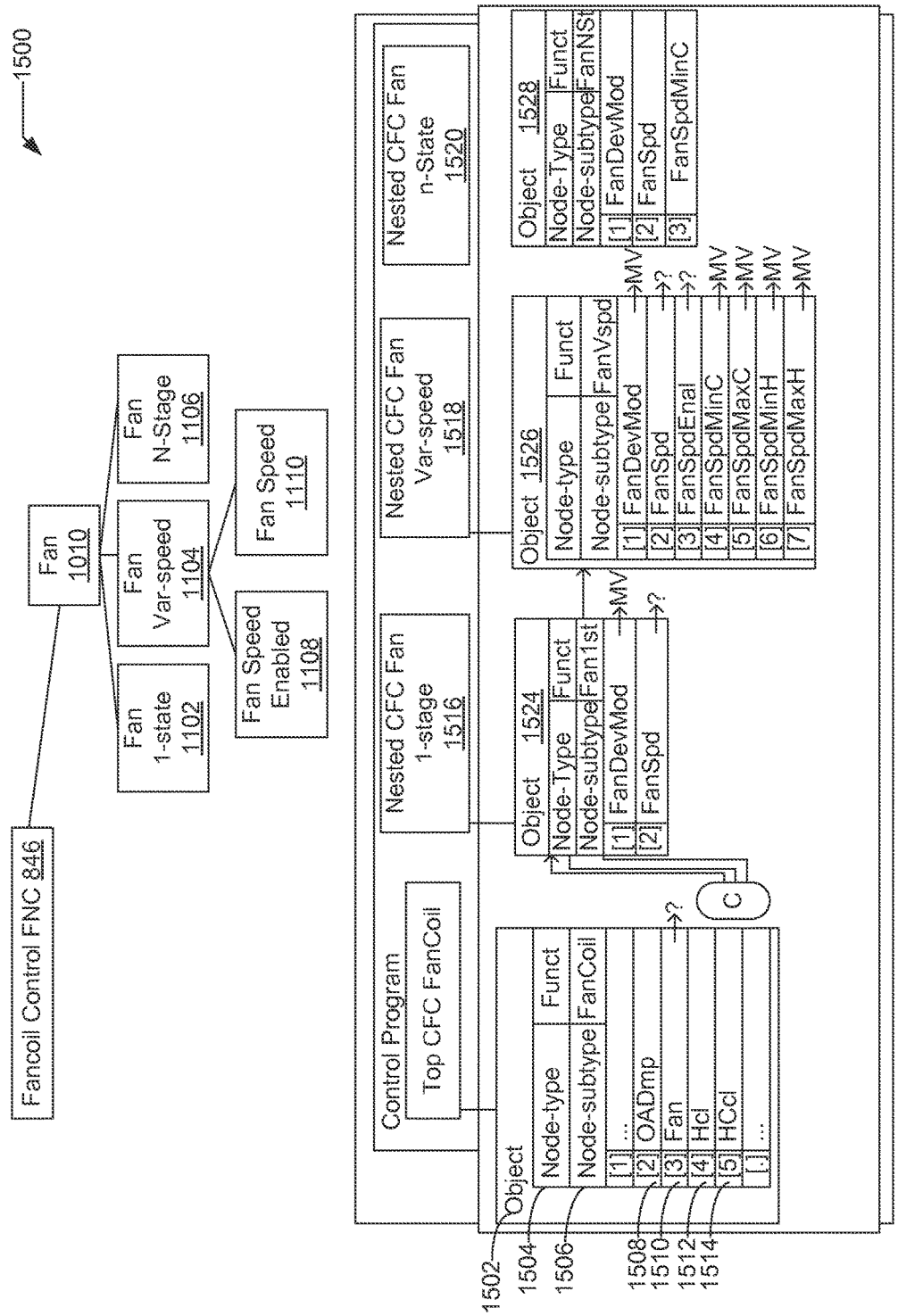
FIG. 15 illustrates an exemplary diagram of a software configuration structure for the sub-module fan 1010 of fan coil 846 of FIG. 8 presented in a graphical interface.

In FIG. 15, an exemplary diagram 1500 of a software configuration structure for the sub-module fan 1010 of fan coil 846 of FIG. 8 presented in a graphical interface is depicted. An object 1502 that defines the data and functions for the fan coil is selected and defined to have multiple nodes. The object may be a node type 1504 "functional" with a node subtype 1506 called "fancoil." Nodes may be defined within the object 1502, such as nodes 1508-1514 that correspond to modules 1102-1106. Each of the nodes may have an associated control program, such as 1516-1520, that may be executed within the common automation system controller 128 when it is initialized or otherwise started. Additionally a fan coil control program may be initiated that is associated with the fan coil control module 846 and object 1502. Each of the nodes may also have additional parameters or data configured, such as 1524-1528. Thus, the fan 1010 has three fan alternatives and during configuration of the common automation system controller 128 (static binding) or at run time (dynamic binding) one of the alternatives may be selected. The selected alternative may then be associated with the coil module or functional unit and respective nested fan sub-modules. Additional sensors and actuators that may have been selected during configuration may also be associated with the selected fan alternative.

Figure 16:
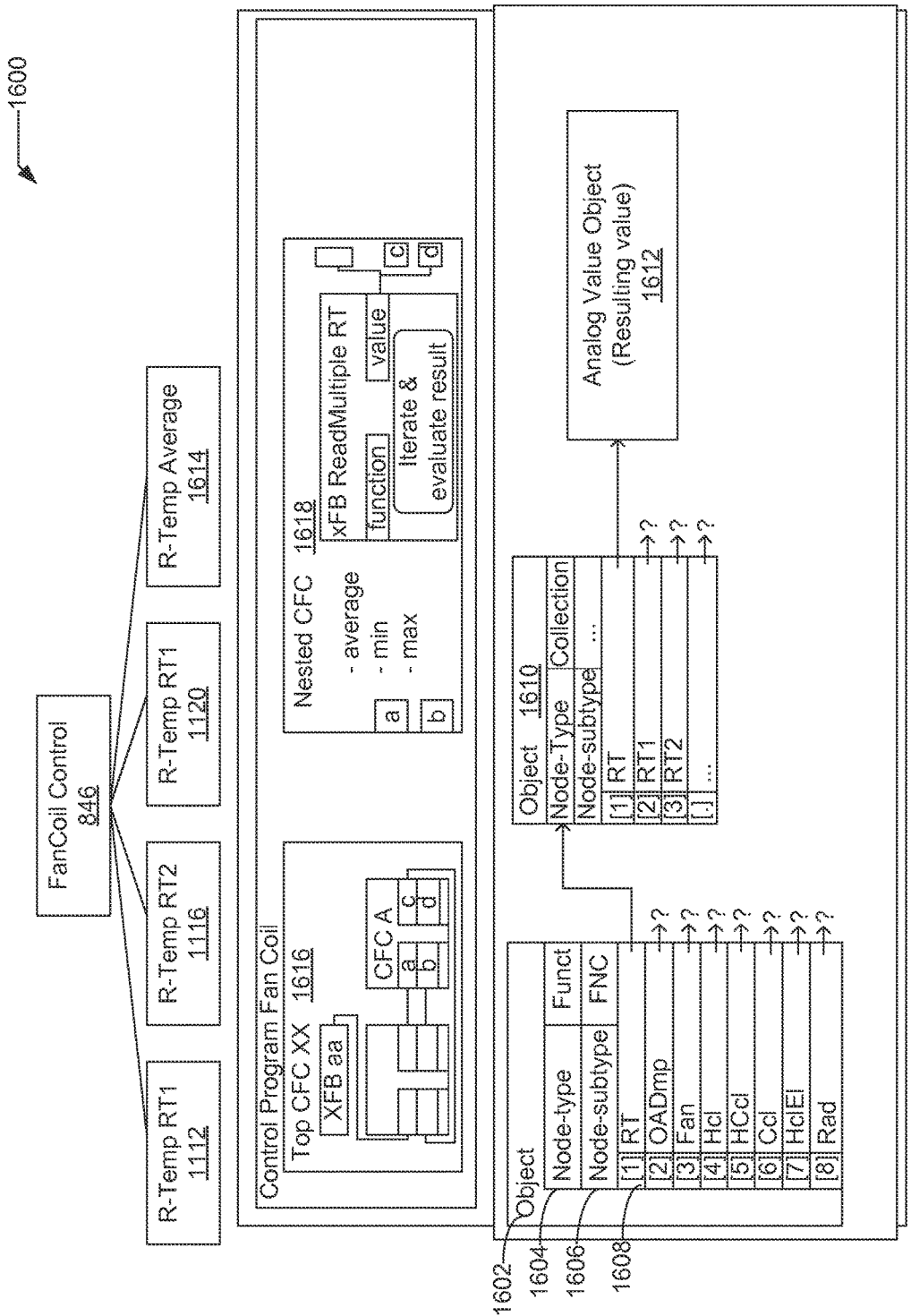
FIG. 16 illustrates an exemplary diagram of a software configuration structure for multiple room temperatures 1112, 1116, and 1118 of FIG. 11 presented in a graphical interface.

Turning to FIG. 16, an exemplary diagram 1600 of a software configuration structure for multiple room temperatures 1112, 1116, and 1120 of FIG. 11 under the fan coil sub-module 846 presented in a graphical interface is depicted. An object 1602 that defines the data and functions for the fan coil is selected and defined to have multiple nodes. The object may be a node type 1604 "functional" with a node subtype 1606 called "FNC." Nodes may be defined within the object 1602 or room temperature sensors, such as node 1608 that correspond to modules 1112, 1116, and 1120. The RT node 1608 may have additional parameters and data configurations for room temperatures 1610 associated with modules 1112, 1116, and 1120. The node 1608 may also be configured to provide output data to other objects, such as analog value object 1612. The output data may be associated with the room temperature average 1614. The object 1602 is associated with a fan coil control parameters and data 1616, which has another nested control portion 1618 for providing additional parameters and data. The room temperature control object 1602 enables one or more room temperature sensors to be added. The sensors may be selected during initial configuration and then employed as a collection object, if an object oriented approach is employed.

Figure 17:
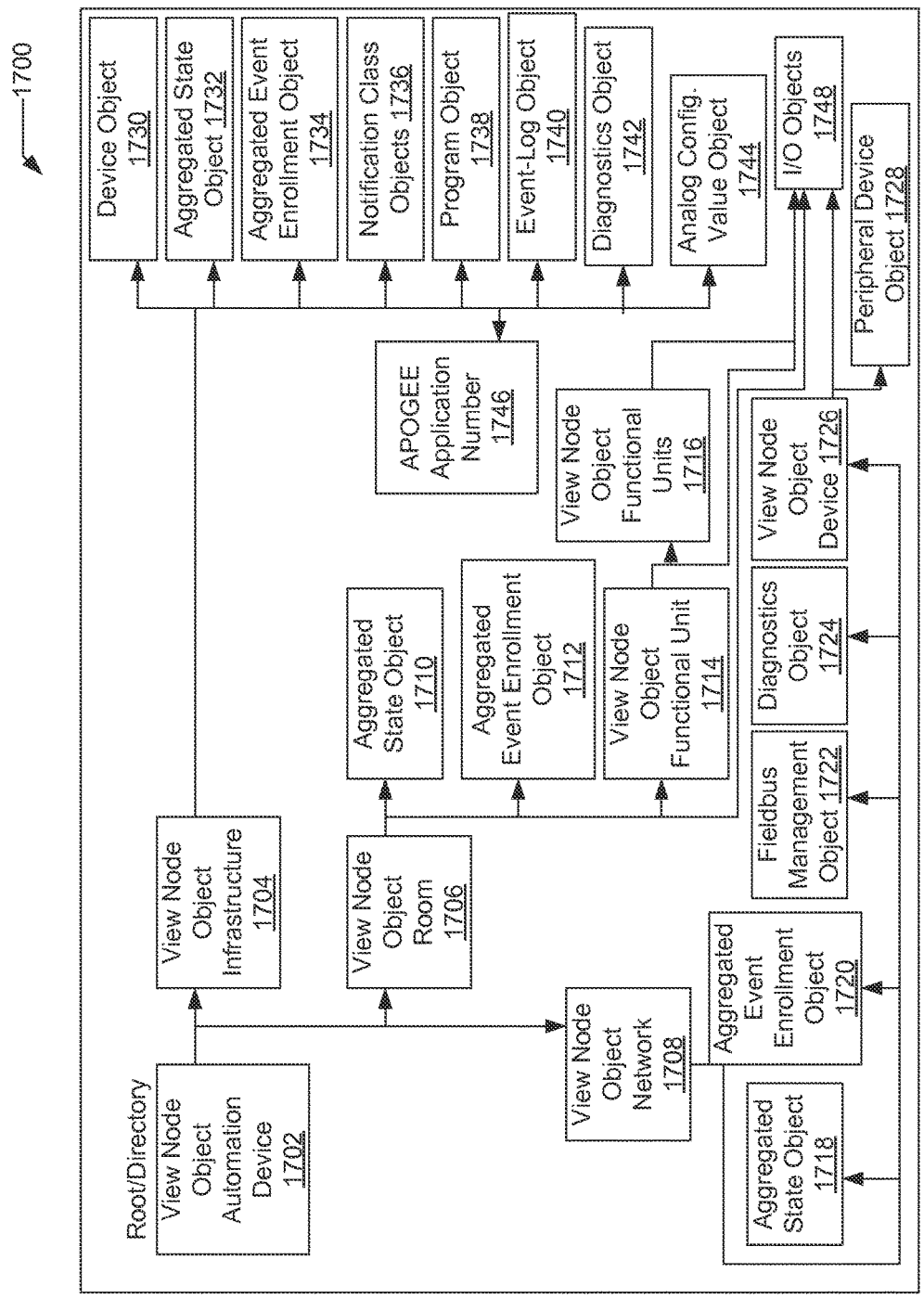
FIG. 17 illustrates an exemplary diagram of a hierarchical structure of the interfaces of the BAS 100 of FIG. 1.

In FIG. 17, an exemplary diagram 1700 of a hierarchical structure of the interfaces of the BAS 100 of FIG. 1 is depicted. The various objects 1702-1748 associated with the interfaces of a BAS 100 may be organized in a hierarchical structure. The aggregated structures may represent different views and navigation paths on various devices in the BAS 100. The aggregation enables system functions and infrastructures, networks and subsystems, rooms and supporting systems to have parameters and data grouped together. Aggregation further provides the ability to nest and encapsulate application control modules and nodes. By using such an approach, configuration and handling of data within the BAS 100 becomes more efficient and less prone to errors.

Figure 18:
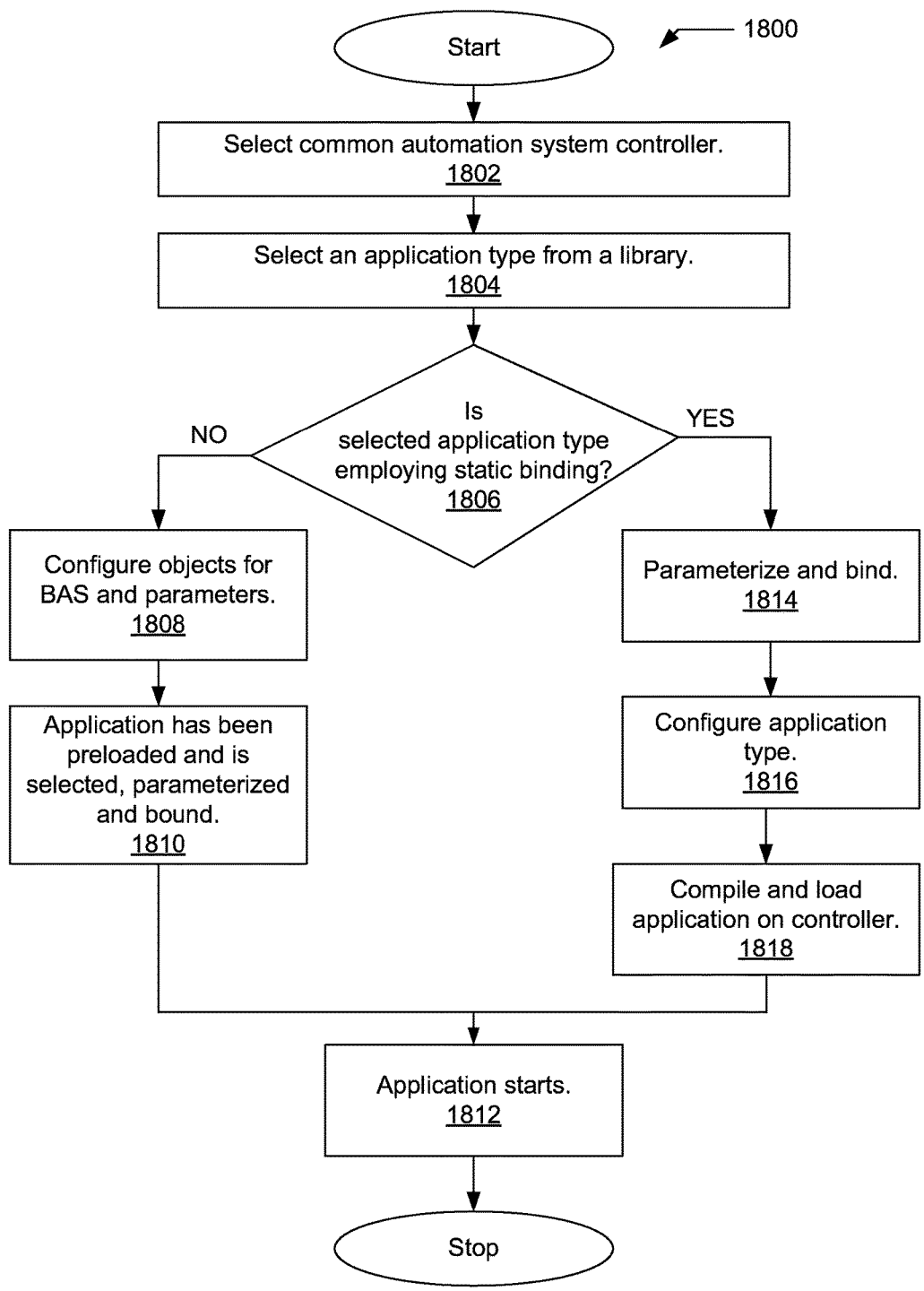
FIG. 18 illustrates a flow diagram of an approach for the configuration of the common automation system controller 128 of FIG. 1 in accordance with an example implementation.

Turning to FIG. 18, a flow diagram 1800 of an approach for the configuration of the common automation system controller 128 of FIG. 1 in accordance with an example implementation is depicted. If more than one type of common automation system controller is supported, the type to be configured is selected in step 1802. One or more application types may be selected for implementation on the common automation system controller 128 from a library 608 of application types in step 1804. A determination for static binding or dynamic binding for the selected application types occurs in step 1806. If dynamic binding is employed, then unnecessary parts are removed at initialization or upon starting. Objects associated with the BAS 100 and parameters may be configured in step 1808 as the application has previously been loaded on the common automation system controller. The selected or used features or modules are selected, parameterized and bound in step 1810. In step 1812 the configured application on the common automation system controller 128 starts.

If static binding of the application type is employed in step 1806, then the selected application type is parameterized and bound in step 1814. The application type is configured for the BAS using the hierarchical approach in step 1816 and the resulting application is compiled and loaded on the common automation system controller 128 in step 1818. In step 1812 the configured application on the common automation system controller 128 starts. When the static binding approach is employed, unnecessary structural parts from applications are removed prior to the application being loaded on the common automation system controller.

The configuration of the common automation system controller employing dynamic binding may be configured using the preloaded applications. The applications may be preloaded prior to deployment at a factory. To load the application, a computer or workstation is typically employed. If static binding is being employed in the configuration of the common automation system controller, a computer or workstation is typically used to initially configure the application types, bind, compile and load the applications.

The foregoing detailed description of one or more embodiments of the Building Synergistic Interface System for a Building Automation System has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A common automation system controller, comprising:
    a memory;
    an input/output interface;
    a library of application types stored in the memory having a hierarchical structure for interfaces for hardware devices of a building automation system (BAS) including different views and navigation paths for various devices in the BAS; and
    a processor coupled to the memory and configured to create an executable application of a selected at least one application type associated with functions for the BAS, where the application is parameterized, compiled, and loaded into the memory of the common system controller, where the compiled application is associated with an application interface specific to functions of the at least one application type and an input/output interface is coupled to devices of the BAS, wherein the processor is configured to:
        select at least one application type from the library of application types;
        determine if the selected application type employs static binding or dynamic binding;
        load the at least one application type in the memory of the common automation system controller if dynamic binding is determined;
        configure objects for the BAS and parameters associated with the at least one application type based at least in part on the library;
        bind the at least one application type resulting in the executable application stored in the memory; and
        start with the processor the executable application stored in the memory.

2. The common automation system controller of claim 1, where the application types include: a) preloaded applications that are not configurable; b) preloaded applications that are configurable; c) proven applications whose functionality may be modified; and d) custom or unique applications.

3. The common automation system controller of claim 1, where the application types are hierarchically configured with objects associated with the BAS and aggregated parameters and data for a plurality of different systems of the BAS that are stored hierarchically in the library.

4. The common automation system controller of claim 1, where each application type includes a network link configuration that enables communication with a least one sensor.

5. The common automation system controller of claim 1, where the input/output interface is associated with an input/output sub-assembly that is defined by the application type.

6. The common automation system controller of claim 1, where the application type includes a hardware configuration with data for peripheral devices of the BAS.

7. The common automation system controller of claim 6, where the peripheral device is a fan controller defined as an object with nodes that further define data and parameters associated with the fan controller.

8. The common automation system controller of claim 6, where the peripheral device is a heat transfer coil controller defined as an object with nodes that further define data and parameters associated with the heat transfer coil controller.

9. The common automation system controller of claim 1, where the application type includes configuring data for control programs, operation & monitoring, and engineering & commissioning functions.

10. A method for configuring a common automation system controller, comprising:
through operation of a processor:
selecting at least one application type from a library of application types stored in a memory having a hierarchical structure for interfaces for hardware devices of a building automation system (BAS) including different views and navigation paths for various devices in the BAS;
determining if the selected application type employs static binding or dynamic binding;
loading the at least one application type in a memory of the common automation system controller by the processor if dynamic binding is determined, where the at least one application type has a plurality of functions including an application interface;
configuring objects for building automation systems and parameters associated with the at least one application type based at least in part on the library;
binding the at least one application type resulting in an executable application stored in the memory, where the application interface is specific to the functions employed; and
starting with the processor the executable application stored in the memory.

11. The method of claim 10, where the at least one application type employs negative variability.

12. The method of claim 10, where unnecessary structural parts of the plurality of structural parts are removed during binding.

13. The method of claim 10, where at least one of the objects for building automation is a fan control object having a plurality of nodes.

14. The method of claim 10, where at least one of the objects for building automation is a heat transfer coil control object having a plurality of nodes.

15. The method of claim 10, where the library has a plurality of application types that include both dynamically bound and statically bound application types.

16. A method for configuring a common automation system controller, comprising:
through operation of a processor:
determining dynamic binding of at least one application type in a library of application types stored in a memory having a hierarchical structure for interfaces for hardware devices of a building automation system (BAS) including different views and navigation paths for various devices in the BAS;
loading the at least one application type in a memory of the common automation system controller by the processor based on dynamic binding being determined, where the at least one application type has a plurality of functions associated with an application interface;
configuring objects for building automation systems and parameters associated with the at least one application type based at least in part on the library;
binding the at least one application type resulting in an executable application stored in the memory, where the application interface is specific to the functions employed; and
starting with the processor the executable application stored in memory.

17. The method of claim 16, where the at least one application type employs negative variability.

18. The method of claim 16, where unnecessary structural parts of the plurality of structural parts are removed during binding.

19. The method of claim 16, where at least one of the objects for building automation is a fan control object having a plurality of nodes.

20. The method of claim 16, where at least one of the objects for building automation is a heat transfer coil control object having a plurality of nodes.

21. A method for configuring a common automation system controller, comprising:
through operation of a processor:
determining dynamic binding of at least one application type in a library of application types stored in a memory having a hierarchical structure for interfaces for hardware devices of a building automation system (BAS) including different views and navigation paths for various devices in the BAS;
loading the at least one application type in a memory of the common automation system controller by the processor based on dynamic binding being determined, where the at least one application type has a plurality of structural parts;
configuring objects for building automation systems and parameters associated with the at least one application type based at least in part on the library, where the at least one application type has a plurality of functions associated with an application interface;
binding the at least one application type resulting in an executable application stored in the memory with the application interface specific to the functions; and
starting with the processor the executable application stored in memory.

22. The method of claim 21, where the at least one application type employs negative variability.

23. The method of claim 21, where unnecessary structural parts of the plurality of structural parts are removed during binding.

24. The method of claim 21, where at least one of the objects for building automation is a fan control object having a plurality of nodes.

25. The method of claim 21, where at least one of the objects for building automation is a heat transfer coil control object having a plurality of nodes.

26. A non-transient computer-readable medium containing instructions for a method for configuring a common automation system controller, comprising instructions for:
determining dynamic binding of at least one application type in a library of application types stored in a memory having a hierarchical structure for interfaces for hardware devices of a building automation system (BAS) including different views and navigation paths for various devices in the BAS;
loading the at least one application type in a memory of the common automation system controller by a processor based on dynamic binding being determined, where the at least one application type has a plurality of structural parts;
configuring objects for building automation systems and parameters associated with the at least one application type based at least in part on the library, where the application type is associated with a plurality of functions and an application interface;

binding the at least one application type resulting in an executable application stored in the memory with an application interface specific to the functions employed; and starting with the processor the executable application stored in memory.

27. The non-transient computer-readable medium containing instructions for a method for configuring a common automation system controller of claim 26, where instructions for binding include instructions for negative variability.

28. The non-transient computer-readable medium containing instructions for a method for configuring a common automation system controller of claim 26, where instructions for binding include instructions for removal of unnecessary structural parts from the plurality of structural parts.

29. The non-transient computer-readable medium containing instructions for a method for configuring a common automation system controller of claim 26, where instructions for configuring include instructions for a fan control object having a plurality of nodes.

30. The non-transient computer-readable medium containing instructions for a method for configuring a common automation system controller of claim 26, where instructions for configuring include instructions for a heat transfer coil control object having a plurality of nodes.

* * * * *